United States Patent [19]

Ozawa

[11] 3,803,400
[45] Apr. 9, 1974

[54] MOVABLE ROOM LAMP DEVICE FOR VEHICLE

[75] Inventor: Masatoshi Ozawa, Kanagawa, Japan

[73] Assignee: Ichiko Industries Limited, Tokyo, Japan

[22] Filed: Sept. 25, 1972

[21] Appl. No.: 291,622

[52] U.S. Cl. ................. 240/61, 240/61.8, 240/61.6, 240/41.6, 240/DIG. 5
[51] Int. Cl. ............................................ F21v 13/06
[58] Field of Search ........ 240/61, 61.8, 61.6, 61.11, 240/41.6, DIG. 5, 78 B

[56] References Cited
UNITED STATES PATENTS

| | | | |
|---|---|---|---|
| 1,697,037 | 1/1929 | Witz | 240/DIG. 5 |
| 1,927,703 | 9/1933 | Glowacki | 240/DIG. 5 |
| 918,443 | 4/1909 | Greenlaw | 240/DIG. 5 |
| 467,294 | 1/1892 | Mills | 240/DIG. 5 |
| 3,679,890 | 7/1972 | Pool | 240/61.6 X |

Primary Examiner—Robert P. Greiner
Attorney, Agent, or Firm—Wenderoth, Lind & Ponack

[57] ABSTRACT

A movable room lamp device for vehicle, comprises a lamp housing having a spherical curved outer surface having a groove formed longitudinally in said spherical curved surface and a stopper formed on a supporting plate assigned to rotatably hold said lamp housing and slidably received in said groove. The cord extending from the lamp housing and being connected to a power source is, consequently prevented from rotating about its own axis, and breakage of the cord and spontaneous detachment of the cord from the terminals during the manipulation of the device are thus eliminated.

2 Claims, 5 Drawing Figures

MOVABLE ROOM LAMP DEVICE FOR VEHICLE

BACKGROUND OF THE INVENTION

1. Field of the Invention

The present invention pertains to a movable room lamp device for vehicles, and more particularly it relates to a movable lamp device for vehicles arranged so that the lamp housing is movable so that the light of the lamp may be directed to and held in any desired direction.

2. Description of the Prior Art

A known room lamp device of this kind comprises: a supporting plate fixed to a wall surface which is one of the components constituting the room of a vehicle, and a lamp housing having an electric bulb contained therein. This housing is formed in a spherical shape. A seat for receiving this spherical housing is provided on the supporting plate. The ball bearing constituted by these members allows the housing to rotate in any desired direction to give a sufficient amount of light to the required site of the room of the vehicle. However, the electric cord which at one end is fixed to the socket of the electric bulb which is mounted in the housing and at the other end connected to the power source is twisted as the housing is rotated and thus there arises the possibility that during the manipulation of the device the cord may be broken or detached from the terminals to which the cord is connected.

SUMMARY OF THE INVENTION

It is, therefore, a primary object of the present invention to provide a movable room lamp device for vehicles, which is perfectly free from breakage of the cord connected thereto.

Another object of the present invention is to provide a movable room lamp of the type described which is arranged so that the lamp housing is positively held, and so that the lamp housing can be positively held stationary at the position to which it has been turned and also which can be fabricated easily.

Still another oject of the present invention is to provide a movable room lamp of the type described, which insures that the lamp housing can be held positively at any position for an indefinite period of time unless a force to rotate the housing is applied thereto.

DETAILED DESCRIPTION OF THE PREFERRED EMBODIMENT

Figure 1:
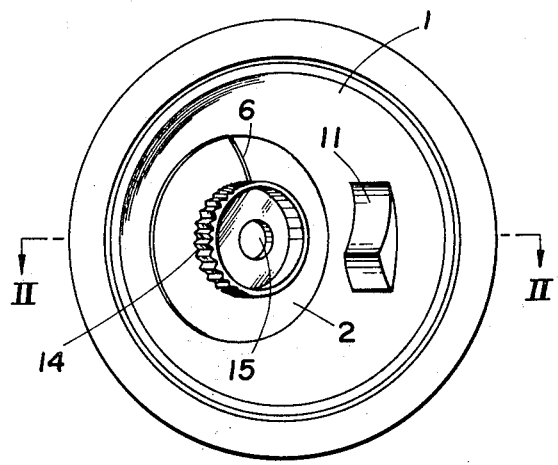
FIG. 1 is a plan view, showing a preferred example of the movable room lamp device according to the present invention.
Figure 2:
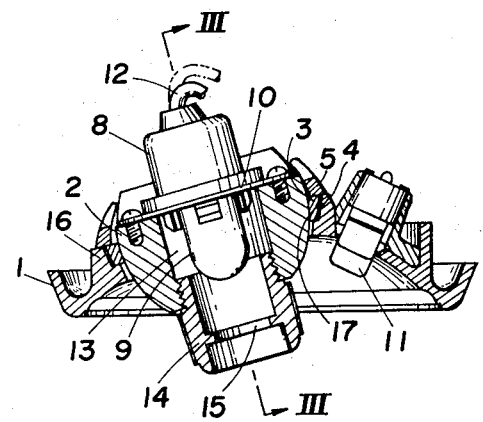
FIG. 2 is a vertical sectional view taken along the line II—II in FIG. 1.
Figure 3:
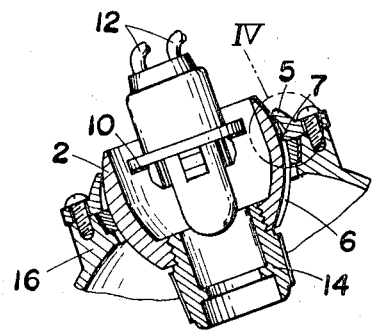
FIG. 3 is a vertical sectional view taken along the line III—III in FIG. 2.
Figure 4:
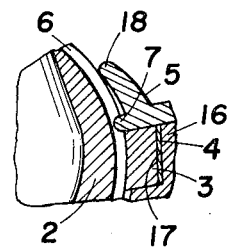
FIG. 4 is a vertical fragmentary sectional view, on an enlarged scale, of the portion contained in the broken circle IV in FIG. 3.

A bulb 9 is of the known wedge-less base type. This bulb 9 is positioned in the through-hole 13 of a lamp housing 2. A socket 8 of the bulb 9 is attached by machine screws to a flat seat which is formed at one end of this through-hole 13 of the housing 2. A female thread is formed on that inner surface of the through-hole 13 located on the side opposite to said one end. A knob 14 having a male thread corresponding to said female thread is screwed into this female thread. This knob 14 is formed with a plastic material having a low thermal conductivity. Said knob 14 has a through-hole which is concentric to the through-hole of the housing 2. A partition plate is provided in this through-hole of the knob 14. An opening 15 having a diameter smaller than that of the through-hole of the knob 14 is provided in the central portion of the partition plate. This opening having a relatively small diameter limits the amount of emission of the light of the electric bulb 9 and also the angular range of illumination of this bulb.

The long housing 2 is rotatably attached to a wall surface, such as a support plate 1 which is fixed to the top panel, which constitutes the room of the vehicle. More specifically, both the lamp housing 2 and the supporting plate 1 consist of, for example, a die-casted article of aluminum or an extrusion-molded article of a plastic material. The supporting plate 1 is of a dome shape and has an opening formed at the top surface of this dome-shaped portion. Around this opening of the dome-shaped portion is provided a collar portion 16 which is arranged to project beyond the rear face of the supporting plate 1, so that said opening of the dome-shaped portion has a cylindrical configuration.

On the other hand, the housing 2 has a spherical external surface and is received in said cylindrical opening of the supporting plate 1 and is supported therein by a holding member 3. This holding member 3 is made of a piece of felt, and is placed on the stepped portion which is formed on the upper portion of the collar portion 16 of the supporting plate 1 and is received in the space defined by the flat surface of the ring portion of a holding ring 5 which is screwed to the upper face of the collar portion 16 and by the surface of the stepped portion of the supporting plate 1.

Figure 5:
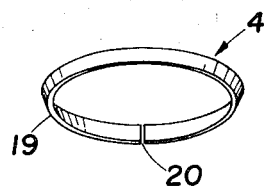
FIG. 5 is a perspective view, on an enlarged scale, of the pressing member.

The vertical wall surface 17 of the stepped portion of the supporting plate 1 is tapered with a curve opening wider as the taper progresses upwardly longitudinally. A pressing member 4 is inserted between the holding member 3 and this vertical wall surface 17. The holding member 3 is urged towards the outer surface of the housing 2 by this pressing member 4. As shown in FIG. 5, the pressing member 4 is made with a narrow, slender, elastic, ring-shaped strip of metal. The side face 19 of this pressing member 4 is inclined so as to follow the inclination of the vertical wall surface 17. A slot 20 is formed locally in said side surface 19. The pressing member 4 is of an oval shape when viewed from thereabove. The diameter of the major axis of this oval shape is substantially equal to the inner diameter of the vertical wall surface 17, whereas the diameter of the minor axis of this oval shape which crosses said major axis at right angle is considerably smaller than the inner diameter of the vertical wall surface 17. Because of this arrangement, the pressing member 4 - when the device is assembled - is deformed elastically and its side face 19 is in tight contact with the vertical wall surface 17. In this state, the elastic restoring force of this pressing member 4 urges the holding member 3 towards the outer surface of the housing 2. As stated above, the side face 19 of this pressing member 4, as well as the vertical wall surface 17, is tapered with a curve opening wider as the taper progresses upwardly longitudinally.

Thus, the housing 2 is pushed upwardly longitudinally.

On the other hand, said holding ring 5 is made with an elastic material, such as a plastic, and has an annular lug 18 which extends longitudinally upwardly from that flat surface of the ring 5 which, in turn, is screwed to the collar portion 16 of the supporting plate 1. This annular lug 18 is curved as it goes toward the upper portion of the curved outer surface of the housing 2. The lug 18 is made so that its foremost annular end portion is of an inner diameter somewhat smaller than the outer diameter of the housing 2 when manufactured. Thus, the lug 18 slidably holds, in cooperation with the holding member 3, the housing 2 which is urged longitudinally upwardly by the holding member 3.

Moreover, the holding ring 5 is such that a part of its flat surfaced portion extends towards the outer surface of the housing 2 to thereby form a stopper 7 on the inner face of the holding ring 5. This stopper 7 is received in the narrow longitudinal groove 6 formed in the surface of the housing 2. This groove 6 runs along the entire longitudinal wall surface of the housing 2. Accordingly, the housing 2 is constrained to move longitudinally upwardly and downwardly only in the direction of the run of the groove 6, and any rotation about the axis of the electric cord 12 extending from the upper portion of the socket 8, is inhibited whereby the cord is prevented from being twisted due to rotation of the housing 2.

A switch 11 is positioned in a square hole formed in the dome-shaped portion of the supporting plate 1 and is fixed to this plate. One of the terminals of this switch 11 is connected to one of two electric cords 12 extending from the socket 8 and the other terminal of said switch 11 is connected and the other one of the cords 12 is respectively connected to a power source not shown.

The movable room lamp device having the aforesaid arrangement is attached, by its flange formed around the dome-shaped portion of the supporting plate 1, to the wall surface of the room of a vehicle, to be fixed to this wall of the room.

I claim:

1. A movable room lamp device for vehicles, comprising:

a lamp housing having a spherical curved outer surface;

a supporting plate for slidably holding said lamp housing therein having a cylindrical opening formed therein, a stepped portion formed in the upper portion of the opening having a longitudinally extending wall having a tapered surface, a holding member placed on said stepped portion; said outer surface of the lamp housing having a groove running longitudinally thereon; and a stopper provided on said supporting plate and being received in said longitudinally running groove, said stopper and a holding ring having an annular lug having an inner diameter smaller than the outer diameter of the housing, and said tapered wall being arranged to urge the housing longitudinally upwardly and the annular lug being arranged to urge said upwardly urged housing downwardly wherein said lamp housing is received in said opening and is supported by said holding member and said annular lug whereby said lamp housing is allowed to rotate only in the direction defined by said groove.

2. A movable room lamp device according to claim 1 in which a pressing member is provided between the holding member and said longitudinal wall surface of the stepped portion, whereby the holding member is always urged against the outer surface of the housing by said pressing member.

* * * * *